United States Patent Office 3,026,902
Patented Mar. 27, 1962

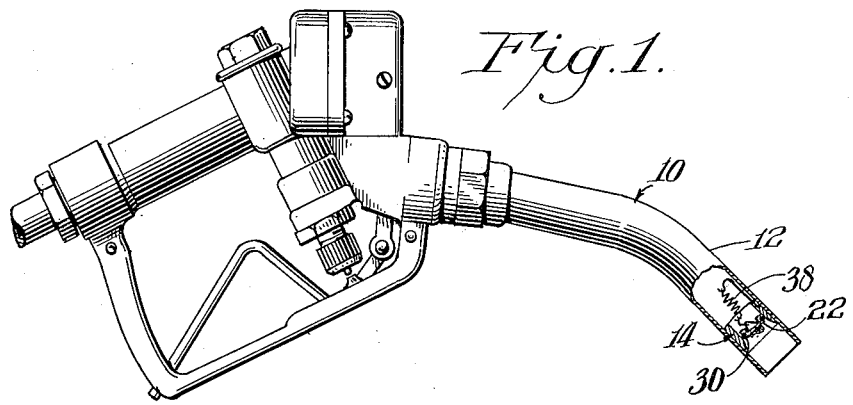
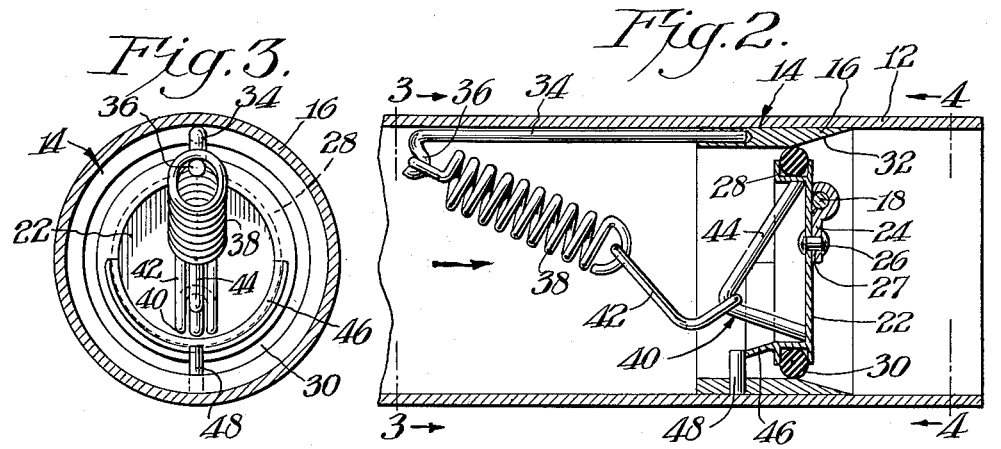
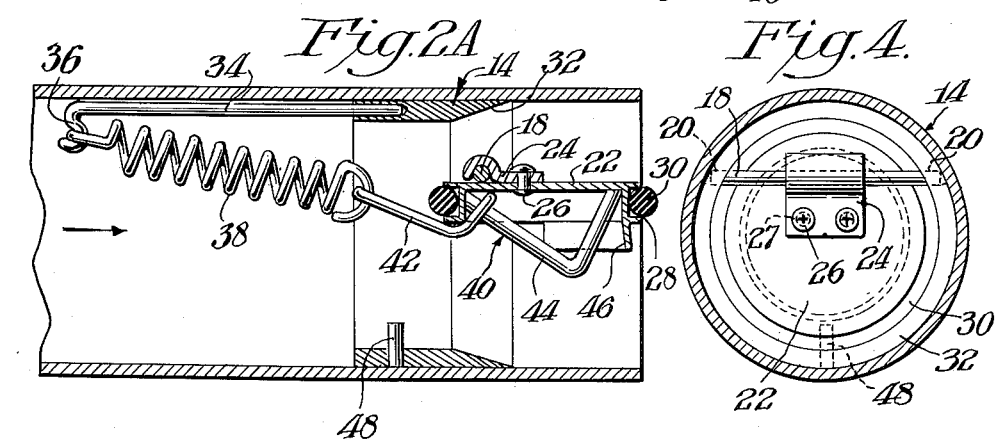
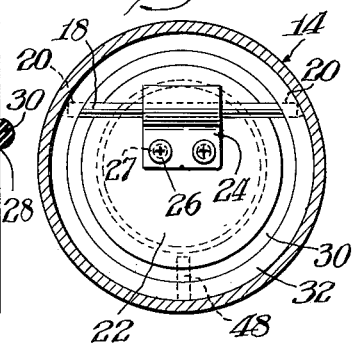

3,026,902
DRIP-PREVENTING VALVE
Edmund W. Ruhl, Jr., Ridgewood, N.J., assignor to Dorsey Drip Regulator Corp., Wilmington, Del., a corporation of Delaware
Filed Dec. 19, 1957, Ser. No. 703,910
7 Claims. (Cl. 137—484.2)

This invention relates to a novel check valve, and more particularly to a novel check valve for preventing drip from a fluid dispensing nozzle.

It is convenient to dispense fluids through a nozzle controlled by a main valve. A system for delivering gasoline, for example, includes a hand-operated nozzle with a rather long snout. A pump is provided to deliver the gasoline under pressure to the dispensing nozzle. When the control valve is actuated, the gasoline flows through the nozzle into the tank of the automobile. If only a main control valve is used, the flexible hose and valve body may be optionally drained, or maintained full of gasoline by the operator. The gasoline remaining within the hose and nozzle may drip from the nozzle between filling operations. A drip of this type may also be troublesome in dispensing other liquids such as valuable or corrosive chemicals. In an attempt to prevent selective drainage of the hose and nozzle, and to prevent excess drippage from the nozzle, it has been proposed to install various check valves in the nozzle body. Examples of these check valves may be seen in U.S. Letters Patent 1,722,985 and 2,553,888. These check valves, however, do not provide a complete solution to the problem. They present a substantial restriction to the free flow of the gasoline through the nozzle and they are not adapted for convenient field installation within existing nozzles.

An object of this invention is to provide a check valve for a fluid dispensig device which is relatively simple and provides relatively unobstructed flow in an opened condition.

Another object of this invention is to provide a check valve structure which is adapted for convenient field installation within existing fluid dispensing nozzles.

In accordance with this invention, a check valve of the butterfly disc type is provided. The butterfly disc is eccentrically pivoted within the fluid dispensing tube so that hydraulic pressure will cause the disc to rotate open when the fluid builds up to a predetermined pressure within the dispensing tube. A toggle-action means is provided to apply an adequate sealing force when the valve is in relatively closed positions and a lesser sealing force when the valve is in relatively opened positions. This helps the valve fly open once the initial pressure reaches the predetermined pressure even though the opening force exerted by the fluid in the disc lessens as the plane of the disc rotates out of the stream of fluid flow into more opened positions.

To help the valve in its intial opening movements, when the force applied by the toggle-action means is greatest, a portion of the valve disc remote from the pivot is extended to provide increased area for reacting with the flow of fluid.

The toggle action may be provided by a spring coupled to the valve disc by means of an angular link. When the valve disc is in relatively closed positions, the line of action of the spring is maintained remote from the pivot to apply relatively higher closing forces. When the valve assumes relatively open positions, the line of action of the spring moves closer to the pivot to minimize the closing force applied to the valve disc. The fluid flow, therefore, is able to rotate a maximum amount of the disc out of its path. Obstruction of fluid flow is thereby minimized when the valve is opened.

The entire assembly may be installed within a short length of tubing which may be conveniently inserted, for example, within the outlet tube of an existing fluid dispensing nozzle. An effective seal may be maintained between the valve disc and its seat by an O-ring installed within a groove provided in the edge of the valve disc. The pivot may be displaced from the plane in which the valve disc seats so that the disc moves entirely clear of the seat when it rotates into opened positions.

Novel features and advantages of the present invention will become apparent to one skilled in the art from a reading of the following description in conjunction with the accompanying drawings in which:

FIG. 1 is a view in elevation, partially in cross section, illustrating how an embodiment of this invention is installed within an existing fluid dispensing nozzle;

FIGS. 2 and 2A are cross-sectional views in elevation of an embodiment of this invention in different phases of operation;

FIG. 3 is a cross-sectional view taken through FIG. 2 along the line 3—3 and looking in the direction of the arrows; and FIG. 4 is a cross-sectional view taken through FIG. 2, along the line 4—4 and looking in the direction of the arrows.

In FIG. 1 is shown a typical gasoline dispensing nozzle 10 including an outlet tube 12. The end of the outlet tube is broken away to show how a check valve 14, which is an embodiment of this invention, is conveniently installed within the outlet tube. The details of this check valve 14 are more clearly illustrated in FIGS. 2, 2A, 3 and 4.

FIGS. 2 and 2A show the check valve 14 as it is installed in any fluid dispensing tube, for example, the outlet tube 12 of a gasoline dispensing nozzle. The check valve is assembled to a short length of tubing 16 which may also be described as a thin-walled cylinder. This thin-walled cylinder 16 is secured within the tube 12 by being press fitted, for example. A more positive installation may be made, however, by pinning or soldering.

Referring to FIGS. 2 and 3 and 4 the various elements and their cooperative relationship are described. A pivot means is provided by a shaft 18 which is eccentrically mounted within the cylinder 16. This shaft 18 is, for example, a round steel wire approximately $\frac{1}{16}$ of an inch in diameter; and it is rotatably mounted, for example, within a pair of holes 20 drilled through the wall of cylinder 16. A round butterfly valve disc 22 is secured to the shaft 18 by means of a strap 24. Strap 24 is secured to the disc, for example, a pair of rivets 26. The spaces between rivets 26 and holes 27 in disc 22 are sealed, for example, by means of a rubber sealing compound which is, for example, applied to rivets 26 before they are secured in place by heating. Shaft 18 is secured, for example, to cylinder 16 in an off-center position so that the force provided by the fluid to opposite sides of disc 22 is unbalanced which causes disc 22 to rotate open when the force of the fluid exceeds a predetermined minimum pressure.

A circumferential groove 28 is provided, for example, in the outer edge of valve disc 22. An O-ring 30, for example, is installed within this groove 28 to provide resilient gasket means for sealing the valve. O-ring 30, for example, is made of rubber and of a diameter sufficiently large to seat firmly within the interior of the cylinder. The inner wall of the cylinder in the direction in which the larger portion of disc 22 rotates is tapered as shown at 32 to allow free motion of the disc in opening and to provide adequate gasket and seat interference on closure.

A rod 34, for example, extends from cylinder 14 in the direction from which the fluid flows. This rod is disposed in line with the direction of fluid flow to offer minimum obstructing resistance to the flow of fluid. The end of the rod remote from the cylinder is hooked at 36 to provide means for anchoring the valve closing spring 38.

A toggle-action closing means, for maintaining the valve closed when the fluid pressure drops below a predetermined pressure, is provided, for example, by spring 38 connected to the valve disc 22, for example, by means of an angular link 40 secured to the face of the disc adjacent the direction from which fluid flows and a bent coupling link 42. This angular link or angular loop 40 is secured to the fluid face of the valve disc by soldering or brazing, for example. This link, for example, is shaped in the form of a triangle with its apex disposed at a point remote from the axis of pivot shaft 18. Spring 38 is connected to this loop through a bent link 42. Link 42 is bent to maintain the line of action of the spring as remote as possible from the pivot point when the valve is in relatively closed positions (as shown in FIG. 2) and to allow the line of action of spring 38 to be diverted around obstructing portions of valve disc 22. This allows the maximum amount of valve disc 22 to be rotated out of the stream of flow. The toggle-action means, therefore, allows the flowing fluid to maintain the valve forcibly rotated into maximum opened positions with minimum obstruction to the flow of fluid. Without this toggle action, the force applied by the spring would increase as the valve is rotated into more opened positions, and it would be difficult to provide enough fluid pressure to maintain the valve fully opened in a moving stream of fluid.

In order to help open the valve against the relatively high closing force applied in more closed positions, the edge of the disc remote from the pivot shaft 18 is extended parallel to the cylinder to form a fluid deflecting portion or cup 46. This fluid deflecting portion 46 is tapered slightly in an outward direction to present maximum area for reacting with the flow of fluid during the initial opening positions of the valve. This extension 46 is provided only on the half of the disc 22 most remote from the pivot shaft so that maximum force is developed by the flow of fluid for opening the valve.

A pin 48 extends within the cylinder in order to limit the closing moment of the valve disc. This pin 48 is struck by the inner edge of the deflector 46 to provide a positive limit for the closing travel of the valve and maintain the disc 22 perpendicular to the stream of flow when it is in the closed position.

The axis of the shaft 18 is, for example, displaced from the plane in which O-ring 30 seats to allow O-ring 30 to move completely free of the seat during the initial stages of the valve movement. This allows the valve to move free of its seat during most of its travel. An extremely free valve movement is thereby provided.

Operation

In operation, this valve provides extremely desirable mechanical and flow characteristics. As pressure builds up on the fluid side of the valve, it reacts on the larger portion of the valve disc to exert an unbalanced force which starts to open the valve. As the valve opens, the displacement of the plane of the valve disc from the pivot clears the disc from interference with the cylinder to allow progressively freer motion.

As the valve opens, the bent link 42 and angular link or loop 40 cooperate to shift the line of action of the spring from the apex of the triangle formed by loop 40 along arm 44 (as shown in FIG. 2) to a line adjacent the pivot shaft 18 (as shown in FIG. 2A). The apex of the triangle is remote from the pivot shaft and provides a moment arm relatively longer than the moment arm provided by portions of the arm 44 nearer the pivot shaft 18. Spring 38, therefore, exerts a greater closing force on the disc when its line of action is at the apex of the triangle rather than at portions of arm 44 adjacent to the pivot shaft. The valve, therefore, provides adequate seating force near closing positions and a desirable reduction in closing force when the valve is rotated by the fluid pressure to relatively opened positions. This lowering in the closing force at opened positions aids in rotating a maximum amount of the valve disc in line with the fluid stream to offer minimum resistance to fluid flow when it is in opened positions (as shown in FIG. 2A). The toggle action is instrumental in providing a positive acting check valve having highly desirable unobstructed flow characteristics.

The deflector or cup 46 first moves into positions substantially obstructing fluid flow in the initial stages of the valve opening movement. This aids in moving the valve to more opened positions against the relatively greater force applied by spring 38 during the initial opening stages of the valve movement.

Valves constructed in accordance with this invention have provided flow capacities equal to that provided by prior art valves, while requiring only approximately ¼ the delivery pressure. Due to the reduction in flow restriction, the valve also is much quieter in operation than prior art valves.

Incorporation of the entire structure within thin-walled cylinder 16 provides a highly compact device which may be conveniently installed in the field within existing fluid dispensing nozzles. One of these assemblies may be easily press fitted, for example, within the outlet tube of an existing gasoline dispensing nozzle. The assembly may be fitted within outlet tubes of varying sizes, for example, by provision of shim sleeves which may be slipped over the outer wall of cylinder 16 to provide a close fit within outlet tubes of varying sizes.

This invention includes parts of simple configuration that may be produced by modern production methods such as automatic screw machines, drill jigs and punch presses. They may also be inexpensively produced by diecasting methods. It may be advantageously used in any fluid system where drip is objectionable, such as where this fluid is, for example, expensive, toxic, corrosive or explosive.

What is claimed is:

1. A check valve comprising a tube, a valve disc of a size and shape substantially corresponding to an inner surface of said tube, rotatable means upon said tube providing an axis of rotation for said valve disc, said valve disc being mounted within said tube by said rotatable means to permit said valve disc to rotate from a closed position in which it engages said inner surface of said tube to open positions, a loop connected to said valve disc, said loop having a portion disposed close to said axis of rotation and another portion disposed remote from said axis of rotation, a spring anchored to said tube and connected to said loop for urging said valve disc towards closed positions, said portions of said loop being connected with each other in such a manner as to shift the line of action of said spring closer to said axis of rotation when said valve disc is in relatively opened postions to minimize the force required to maintain said valve opened when said disc is oriented in said relatively open positions, said axis of rotation being disposed closer to one side of said tube to eccentrically pivot said valve disc within it, the portion of said loop remote from said axis of rotation being closer to the point at which said spring is anchored to said tube when said valve disc is in the closed position, said other portion of said loop closer to said axis of rotation being closer to said anchoring point of said spring in said tube when said disc is in said relatively open positions, said loop being attached to the upstream side of said disc, said spring being anchored to a point in said tube upstream of said disc, an angular link connecting the end of said spring to said loop, and said link being bent away from said axis of rotation to permit the line of action of said spring to be diverted around obstructing portions of said valve disc.

2. A check valve comprising a tube, a valve disc of a size and shape substantially corresponding to an inner surface of said tube, rotatable means upon said tube providing an axis of rotation for said valve disc, said valve disc being mounted within said tube by said rotatable means to permit said valve disc to rotate from a closed position in which it engages said inner surface of said tube to opened positions, a loop connected to said valve disc, said loop extending from one portion which is relatively close to said axis of rotation to another portion which is relatively remote from said axis of rotation, a spring anchored to said tube and loosely connected to said loop for urging said valve disc towards closed positions, said spring and said loop being constructed and arranged to dispose said portion of said loop relatively remote from said axis of rotation nearer to the point of anchoring said spring when said valve disc is in said closed position to forcefully maintain said valve disc closed, said spring and said loop being constructed and arranged to dispose said portion of said loop relatively close to said axis of rotation nearer to the point of anchoring of said spring when said valve disc is in opened positions to minimize the force required to maintain said valve in said opened positions, and said portions of said loop being smoothly connected with each other from said one portion to the other which permits the point of connection of said spring to said loop to automatically shift from one of said portions of said loop to the other in accordance with which of said portions is nearer to said point of anchoring of said spring as said valve disc moves from opened to closed positions.

3. A check valve as set forth in claim 2 wherein said axis of rotation is disposed closer to one side of said tube to eccentrically pivot said valve disc within it.

4. A check valve as set forth in claim 3 wherein said loop is attached to the upstream side of said disc, and said spring is anchored to a point in said tube upstream of said disc.

5. A check valve as set forth in claim 2 for convenient installation within a fluid conducting tube wherein said tube is comprised of a length of tubing for insertion within a fluid-conducting conduit, an extension projects from said length of tubing away from the upstream side of said disc to provide means for anchoring said spring, and said loop is attached to the upstream side of said disc.

6. A check valve as set forth in claim 2 wherein gasket means are installed about the outer edge of said disc to help seal the junction between said disc and said inner surface of said tube.

7. A check valve as set forth in claim 2 wherein a flow-obstructing projection extends from the upstream side of said disc at a portion thereof remote from said axis of rotation to provide increased area for reacting with fluid passing through said valve to maintain said disc in opened positions.

References Cited in the file of this patent

UNITED STATES PATENTS

| | | |
|---|---|---|
| 973,641 | Dysart | Oct. 25, 1910 |
| 1,266,130 | Kimbler | May 14, 1918 |
| 1,317,047 | Shields | Sept. 23, 1919 |
| 1,330,265 | Hinton | Feb. 10, 1920 |
| 1,725,428 | Tilden | Aug. 20, 1929 |
| 1,871,536 | Le Bus | Aug. 16, 1932 |
| 2,627,418 | Ainsworth | Feb. 3, 1953 |
| 2,657,896 | Muller | Nov. 3, 1953 |
| 2,725,895 | Chansion | Dec. 6, 1955 |
| 2,753,933 | Wolfe | July 10, 1956 |
| 2,827,921 | Sherman | Mar. 25, 1958 |